United States Patent
Grocutt et al.

(10) Patent No.: US 10,831,494 B2
(45) Date of Patent: Nov. 10, 2020

(54) EVENT TRIGGERED PROGRAMMABLE PREFETCHER

(71) Applicants: ARM LIMITED, Cambridge (GB); THE CHANCELLOR, MASTERS AND SCHOLARS OF THE UNIVERSITY OF CAMBRIDGE, Cambridge (GB)

(72) Inventors: Thomas Christopher Grocutt, Cambridge (GB); Sam Ainsworth, Cambridge (GB); Timothy Martin Jones, Cambridge (GB)

(73) Assignees: ARM Limited, Cambridge (GB); The Chancellor, Masters and Scholars of the University of Cambridge, Cambridge (GB)

( * ) Notice: Subject to any disclaimer, the term of this patent is extended or adjusted under 35 U.S.C. 154(b) by 79 days.

(21) Appl. No.: 15/774,066

(22) PCT Filed: Oct. 18, 2016

(86) PCT No.: PCT/GB2016/053216
§ 371 (c)(1),
(2) Date: May 7, 2018

(87) PCT Pub. No.: WO2017/085450
PCT Pub. Date: May 26, 2017

(65) Prior Publication Data
US 2018/0314526 A1    Nov. 1, 2018

(30) Foreign Application Priority Data
Nov. 16, 2015   (GB) .................................. 1520145.2

(51) Int. Cl.
*G06F 9/30* (2018.01)
*G06F 9/38* (2018.01)
(Continued)

(52) U.S. Cl.
CPC .......... *G06F 9/3814* (2013.01); *G06F 9/3806* (2013.01); *G06F 12/0862* (2013.01);
(Continued)

(58) Field of Classification Search
None
See application file for complete search history.

(56) References Cited

U.S. PATENT DOCUMENTS 7,457,923 B1    11/2008  Chou et al.
2014/0258629 A1*  9/2014  Busaba .............. G06F 12/0862
                                                711/130

FOREIGN PATENT DOCUMENTS

GB    2 506 902      4/2014
WO    2014/136003    9/2014

OTHER PUBLICATIONS

Zhang et al., "Architectural adaptation for application-specific locality optimizations", Computer Design: VLSI in Computers and Processors—1997, Oct. 12, 1997, pp. 150-156.
(Continued)

*Primary Examiner* — Corey S Faherty
(74) *Attorney, Agent, or Firm* — Nixon & Vanderhye, P.C.

(57) ABSTRACT

A main processor 4 executes a main program and has an associated cache memory 6. Event detection circuitry 12 detects events consequent upon execution of the main program and indicative of data to be used by the main processor. One or more programmable further processors 16, 18 is triggered to execute a further program by the events detected by the event detection circuitry 12. Prefetch circuitry 28 is responsive to the further program executed by the one or more programmable further processors to trigger prefetching of the data to be used by the main processor to the cache memory.

20 Claims, 6 Drawing Sheets

(51) Int. Cl.
*G06F 12/0862* (2016.01)
*G06F 12/0875* (2016.01)
*G06F 12/1027* (2016.01)

(52) U.S. Cl.
CPC ...... *G06F 12/0875* (2013.01); *G06F 12/1027* (2013.01); *G06F 2212/1016* (2013.01); *G06F 2212/1021* (2013.01); *G06F 2212/1044* (2013.01); *G06F 2212/1048* (2013.01); *G06F 2212/452* (2013.01); *G06F 2212/6022* (2013.01)

(56) References Cited

OTHER PUBLICATIONS

International Search Report and Written Opinion of the ISA dated Dec. 15, 2016, 12 pages.
Combined Search and Examination Report for GB1520145.2 dated May 4, 2016, 14 pages.
Examination Report dated Oct. 17, 2018 in GB Application 1520145.2, 8 pages.
Examination Report for GB Application No. 1520145.2 dated Oct. 22, 2019, 2 pages.

\* cited by examiner

EVENT TRIGGERED PROGRAMMABLE PREFETCHER

This application is the U.S. national phase of International Application No. PCT/GB2016/053216 filed Oct. 18, 2016 which designated the U.S. and claims priority to GB Patent Application No. 1520145.2 filed Nov. 16, 2015, the entire contents of each of which are hereby incorporated by reference.

This disclosure relates to the field of data processing systems. More particularly, this disclosure relates to prefetching data (values to be manipulated and/or program instructions) to a cache memory.

It is known to provide prefetch circuitry to prefetch data based upon identifying regular access patterns within the memory, e.g. strided accesses. However, such prefetch circuitry does not work well for irregular patterns of access found in many workloads, e.g. pointer chasing, compressed sparse matrices, etc. In order to achieve better prefetch performance with such workloads, one approach is to embed preload instructions within the programs being executed. However, in practice, such preload instructions may be ineffective due to significant differences in the execution environment of the program which arise, e.g. the program being executed upon different hardware platforms, the hardware platforms changing state (such as operating at different DVFS operating points), the hardware platform operating in different modes (e.g. whether a big core or a little core is currently in use in a big.LITTLE system as designed by ARM Limited, Cambridge, England), the latency of various elements in a cache hierarchy, whether data is already present within other caches within a cache hierarchy, and the variable number of instructions which my be executed in dependence upon the particular execution path being followed. Since these factors vary between different systems, or even at runtime due to the particular state of the system at a given instant, preload instructions coded into the program to be executed have limited usefulness. Preload instructions may in given circumstances prefetch data too soon, and thereby needlessly occupy cache capacity, or too late, and thereby delay execution. Further, such preload instructions require the address of the target load to be fully computed before they are performed with the result that accesses to data involving multiple lookups often result in pipeline stalls thereby limiting the efficacy of such schemes.

At least some embodiments of the disclosure provide apparatus for processing data comprising:

a main processor to execute a main program;

a cache memory coupled to said main processor;

event detection circuitry to detect events consequent upon execution of said main program by said main processor and indicative of data to be used by said main processor;

a further processor responsive to detection of one or more of said events by said event detection circuitry to trigger execution of a further program by said further processor; and prefetch circuitry responsive to said further program to trigger prefetch of said data to be used by said main processor to said cache memory;

wherein said event detection circuitry comprises programmable filter circuitry to detect a memory operation matching a programmable filter characteristic; and said programmable filter characteristic comprises said memory operation is directed to a memory address within one or more programmable memory address ranges.

At least some embodiments of the disclosure provide apparatus comprising:

main processor means for executing a main program;

cache memory means for storing data and coupled to said main processor means;

event detection means for detecting events consequent upon execution of said main program by said main processor means and indicative of data to be used by said main processor means;

further processor means responsive to detection of one or more of said events by said event detection means for triggering execution of a further program by said further processor means; and prefetch circuitry means responsive to said further program for triggering prefetch of said data to be used by said main processor means to said cache memory;

wherein said event detection circuitry comprises programmable filter circuitry to detect a memory operation matching a programmable filter characteristic; and said programmable filter characteristic comprises said memory operation is directed to a memory address within one or more programmable memory address ranges.

At least some embodiments of the disclosure provide a method of controlling data prefetch comprising:

executing a main program with a main processor;

storing data in a cache memory coupled to said main processor;

detecting events including a memory operation directed to a memory address within one or more programmable memory address ranges consequent upon execution of said main program by said main processor and indicative of data to be used by said main processor;

in response to detection of one or more of said events, triggering execution of a further program by a further processor; and in response to said further program, triggering prefetch of said data to be used by said main processor means to said cache memory.

Example embodiments will now be described, by way of example only, with reference to the accompanying drawings in which.

Figure 1:
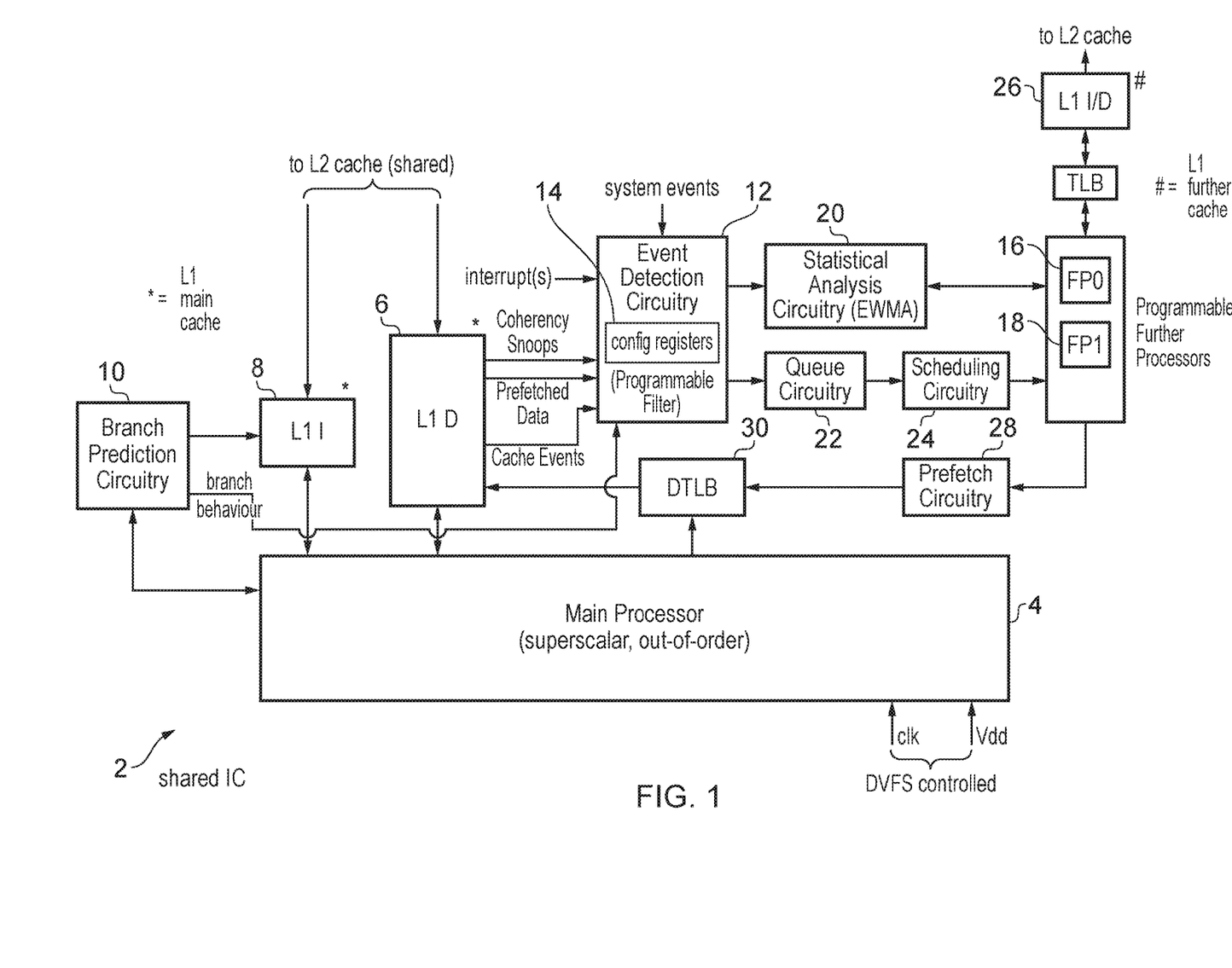
FIG. 1 schematically illustrates an integrated circuit including a main processor and prefetch circuitry controlled by a plurality of event driven further processors.

FIG. 1 schematically illustrates part of an integrated circuit 2 including a main processor 4 for executing a main program. The main processor 4 is coupled to a level one data cache 6 and a level one instruction cache 8 (which may be provided with a translation lookaside buffer (not shown)) to provide low latency access to values to be manipulated and program instructions to be executed. The level one data cache 6 and the level one instruction cache 8 are part of a memory hierarchy which is coupled to a level two cache memory (unified) and further coupled to a main memory (which may or may not be formed upon the same integrated circuit 2).

Branch prediction circuity 10 generates predicted branch behaviour signals used to control speculative out-of-order execution of program instructions by the main processor 4.

The main processor 4 is a relatively high performance, high power consumption processor. Event detection circuitry 12 serves to detect events consequent upon execution of the main program by the main processor 4. The event detection circuitry 12 is programmable via configuration registers 14 to serve as programmable filter circuitry to detect, for example, a memory operation matching a predetermined filter characteristic, at least including a memory operation directed to a memory address within one or more programmable memory address ranges. The event detection circuitry 12 may also serve to detect additional types of event. In the example illustrated, the event detection circuitry 12 is connected to the level one data cache 6 and detects cache events which may include one or more of a cache fetch event which initiates a fetch of data to the level one data cache 6, a cache fill event in which fetch data is loaded into the level one data cache 6, a cache eviction event, a cache hit event and/or a cache miss event. The programmable filter characteristics used by the event detection circuitry may also take other forms useful in particular circumstances such as detecting one or more of: whether a memory operation relates to reading data from memory (a main memory), whether a memory operation relates to storing data to memory, a data size of a memory operation, security permissions associated with a memory operation, and/or whether a memory operation is a cache hint operation. In some embodiments memory transactions issued out to the memory to fetch data may be tagged (possibly reusing transaction tags already provided for use in interconnects) and then an event generated when the returned data identified using the tag to match against a predetermined tag value (stored when the transaction was initiated). Further types of events associated with the level one data cache 6 to which the event detection circuitry 12 may be responsive include coherency snoops to the level one data cache 6 arising when the level one data cache 6 is part of a shared coherent memory system, and/or prefetch data values themselves such that these can be matched against programmable filters configured using the configuration registers 14. The above represents only some examples of events which may be detected by the event detection circuitry 12. For example, further events which may be detected include predicted branch behaviour signals from the branch prediction circuitry 10, interrupt signals, system events from elsewhere within an overall system (e.g. system events indicative of activity upon an associated graphics processing unit) as well as further state of the system as a whole.

The events detected by the event detection circuitry may be selected so as to be indicative of data to be used by the main processor 4 when executing the main program. The correlation between the events detected and the data to be used may be indirect, and may not be completely accurate, e.g. due to changes in the behaviour/workload of the main processor 4 which require a finite amount of time in order that the prefetching mechanisms may adapt to those changes. The indirect relationship between the events detected and the data to be used by the main processor is one reason why it is difficult to use static hardware prefetch mechanisms, such as stride prediction, to provide effective prefetching in a flexible and scalar manner which is able to adapt to the execution environment and runtime changes.

In the example illustrated in FIG. 1, the event detection and prefetching is associated with the level one data cache 6 into which values to be manipulated by program instructions executed by the main processor 4 are prefetched. However, the techniques of this disclosure are equally applicable alternatively, or additionally, to the prefetching of program instructions which are cached within the level one instruction cache 8. The present techniques encompass these possibilities.

The event detected by the event detection circuitry 12 may be used to trigger execution of a further program by one of a plurality of programmable further processors 16, 18, which operate at the same privilege level, within a plurality of privilege levels, such as the main processor 4, i.e. they move between privilege levels at the same time and in the same way. However, not all of the events detected may be used to trigger such further program execution. Some of the events detected may be used for the purpose of determining one or more statistical values using statistical analysis circuitry 20. This statistical analysis circuitry 20 may also be responsive to one or more inputs from the further program or programs executed by the programmable further processors 16, 18. The statistical values calculated may take a variety of different forms, including exponential weighted moving average values, minimum values and/or maximum values. Other statistical values may also be calculated. The statistical analysis circuitry 20 may be configured with programmable configuration registers (not illustrated) in a similar manner to the event detection circuitry 12. Depending upon the configuration applied, the statistical analysis circuitry 20 can calculate desired statistical values. As an example, the statistical analysis circuitry 20 may serve to determine a memory latency value indicative of a time taken to fetch data to the level one data cache 6 from a main memory. This memory latency value may have the form of an exponentially weighted moving average value, a minimum value or a maximum value depending upon the particular prefetch controlling technique being used by the further program. The further program or programs executed by the further processors 16, 18 are able to read and/or write the statistical values determined by the statistical analysis circuitry 20 at points in the execution of the further programs so as to control the prefetching triggered in dependence upon those read values.

Some of the events detected by the event detection circuitry 12, either individually or in combination, may be used to trigger execution of the further program or programs by the programmable further processors 16, 18. When such triggering events are detected, then an entry is made into queue circuitry 22 to identify those events (and optionally with metadata which may be read and used by the subsequently triggered further program or programs). Scheduling circuitry 24 reads queued events from the queue circuitry 22 and initiates execution of an appropriate further program by an available programmable further processor 16, 18. If all of the programmable further processors 16, 18 are already active (not idle), then the scheduling circuitry 24 waits until one of the programmable further processors 16, 18 becomes inactive before using the next entry within the queue circuitry 22 to trigger a further instance of execution of the further program. The events queued within the queue circuitry 22 may be issued to any of the programmable further processors 16, 18 and so the programmable further processors 16, 18 should all be capable of executing the same further program or programs. In some embodiments, a single further program may be provided and serve to analyse the nature of the event to which it is responding and adapt its processing accordingly. In other embodiments, different further programs may be triggered for execution by the scheduling circuitry 24 in dependence upon a parameter associated with the queued event within the queue circuitry 22 which is being scheduled for execution (analogous to triggering of one or several interrupt handling routines using interrupt vectors).

A further cache memory 26 is coupled via a translation lookaside buffer to the programmable further processors 16, 18 and serves to store at least part of one of the further program or programs to be executed by the programmable further processors 16, 18 and/or data values to be manipulated by the programmable further processors 16, 18. When the programmable further processors 16, 18 have completed execution of a further program in response to a detected event or events, then they return to an idle state until they are next scheduled to perform execution of a further program by the scheduling circuitry 24. The number of programmable further processors 16, 18 present within the system may be scaled depending upon the required capacity to handle prefetching control, which in turn can dependent upon the anticipated level of difficulty and/or intensity of control of prefetching.

The further programs executed by the programmable further processors 16, 18 analyse the detected events and trigger prefetch circuitry 28 to prefetch data, anticipated as to be used by the main processor 4, into the level one data cache 6. Any address translation from virtual to physical addresses required is performed by a data translation lookaside buffer 30 within the path between the prefetch circuitry 28 and the level one data cache 6. The further programs executed by the programmable further processors 16, 18 may be relatively short, but nevertheless provide a flexible and sophisticated way to control prefetching in a manner that is difficult to achieve with purely hardware based prefetching mechanisms.

The further programs can be quite separate from the program executed by the main processor 4 enabling greater scalability and flexibility in the way in which they operate. When a further program has finished triggering a prefetch or other operation, it returns to an idle state in which it is available to do other work. In contrast a helper program mirroring the action of a main program would stall awaiting its next data item and would not be available for other use. This event driven architecture also enables the performance of the further programs to scale substantially linearly with the number of programmable further processors 16, 18. This is because the events that trigger the further programs are independent from one another and thus the execution further programs can be done in parallel by multiple further processors. The multiple further programs (or parts of a program) enabled by this event driven approach also permits more ready handling of the prefetching of multiple simultaneous streams of data with different characteristics (e.g. latency).

The further programs are able to detect and respond to the current state of the system in order to vary the way in which they control the prefetching behaviour, e.g. a currently estimated memory latency determined from the statistical analysis circuitry 20 may be used such that prefetching of data is triggered via the prefetch circuitry 28 to arrive "just-in-time" within the level one data cache 6 for its use by the main processor 4 (this assists in avoiding the main processor 4 stalling due to the absence of that data and yet does not unnecessarily consume capacity within the level one data cache 6 by fetching the prefetch data too soon). Further examples of the way in which the further programs may control prefetching include pointer chasing whereby as soon as data is returned to the level one data cache 6 this may be detected by the event detection circuitry 12 and then prefetching of the next data associated with the next pointer initiated without requiring the main processor 4 or the main program to have reached any particular state.

The main processor 4, as previously mentioned, may be a high performance high power consumption processor, such as a superscalar out-of-order processor. In contrast, the programmable further processors 16, 18 may be relatively low performance, lower power consumption processors, as they are required to execute relatively simply further programs dedicated to the task of initiating appropriate prefetching operations by the prefetch circuitry 28. The overhead associated with the provision of the further processors 16, 18 is accordingly relatively small in the context of the overhead associated with the provision of the main processor 4.

Figure 2:
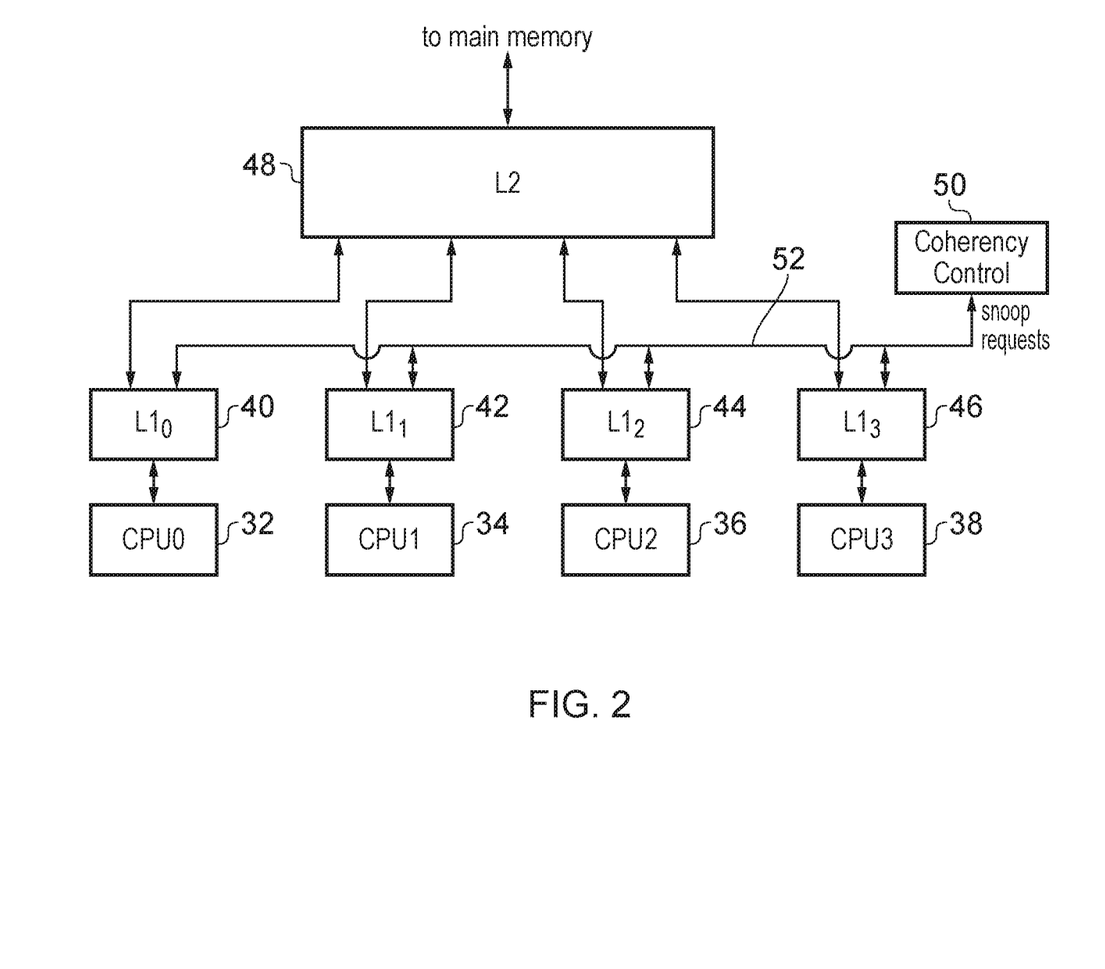
FIG. 2 schematically illustrates a coherent shared memory system.

As previously mentioned, one of the types of event which may be detected by the event detection circuitry 12 is coherency snoops. Coherency snoops arise in the context of the operation of a shared coherent memory, such as that of the system schematically illustrated in FIG. 2. FIG. 2 shows a plurality of processors 32, 34, 36, 38 each having an associated level one cache memory 40, 42, 44, 46 which is able to store locally data or program instructions. The processors 32, 34, 36, 38 are connected to a shared level two cache memory 48 and a shared main memory system. An individual level one cache memory 40, 42, 44, 46 may hold a copy of data form a given memory address within the memory system. If another processor then wishes, for example, to modify that data value, then it is necessary to invalidate the copy of that data value held in the original cache memory holding that data value and fetch a copy of that data value into the level one cache memory of the processor wishing to modify that data value. This behaviour is controlled using coherency control circuitry 50 which exchanges snoop messages via a snoop bus 52. The event detection circuitry 12 may observe these snoop messages in order to give an indication of the behaviour elsewhere within the system which may correlate with the prefetch behaviour required within the part of the system associated with that event detection circuitry 12.

Figure 3:
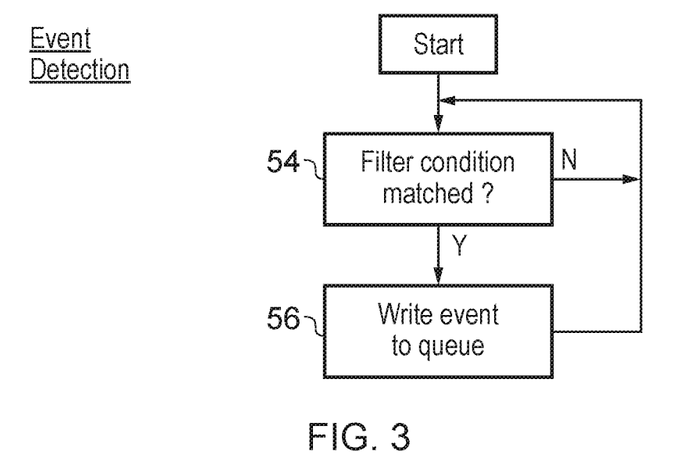
FIG. 3 is a flow diagram schematically illustrating event detection.

FIG. 3 is a flow diagram schematically illustrating operation of the event detection circuitry 12 performing event detection. At step 54 processing waits until a filter condition as configured by the configuration registers 14 is matched. When such a filter condition is matched, processing proceeds to step 56 where an event (and optionally associated metadata characterising that event) is written into the queue circuitry 22 in order that it may subsequently trigger execution of a further program by one of the programmable further processors 16, 18. Processing then returns to step 54. The queue circuitry 22 has a finite capacity and, if full, then space may be freed to store new events by deleting old events. Prefetching does not impact the correctness of execution, merely performance.

Figure 4:
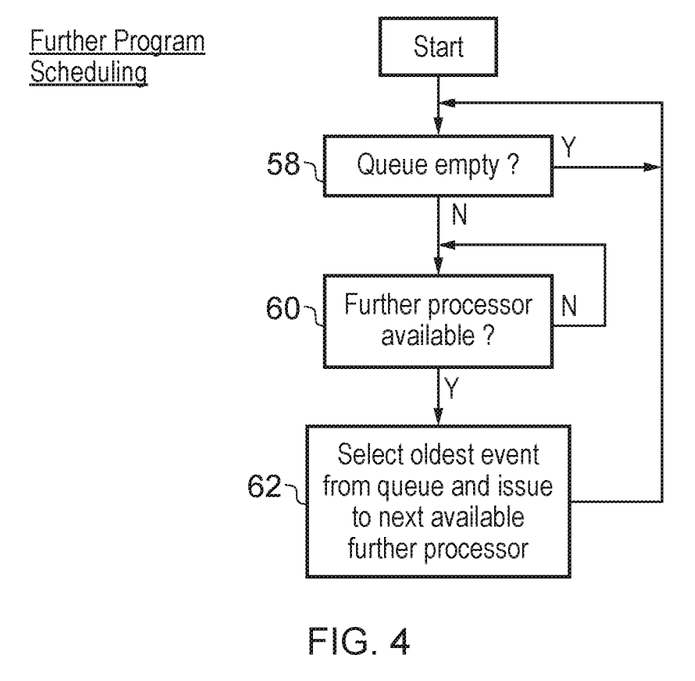
FIG. 4 is a flow diagram schematically illustrating further program scheduling.

FIG. 4 is a flow diagram schematically illustrating the operation of the scheduling circuitry 24 in triggering the execution of the further program or programs by the programmable further processors 16, 18. At step 58 processing waits while the queue circuitry 22 remains empty. When the queue circuitry 22 is not empty (at least one event is queued), processing proceeds to step 60 where processing waits until one of the programmable further processors 16, 18 is available to perform execution of the further program (s) in response to the event being scheduled (i.e. one of the programmable further processors 16, 18 becomes idle or is already idle). When one of the programmable further processors 16, 18 is available as detected at step 60, then step 62 serves to select the oldest event queued within the queue circuitry 22 and issue this to the next available programmable further processor 16, 18 and it triggers execution of an associated further program.

Figure 5:
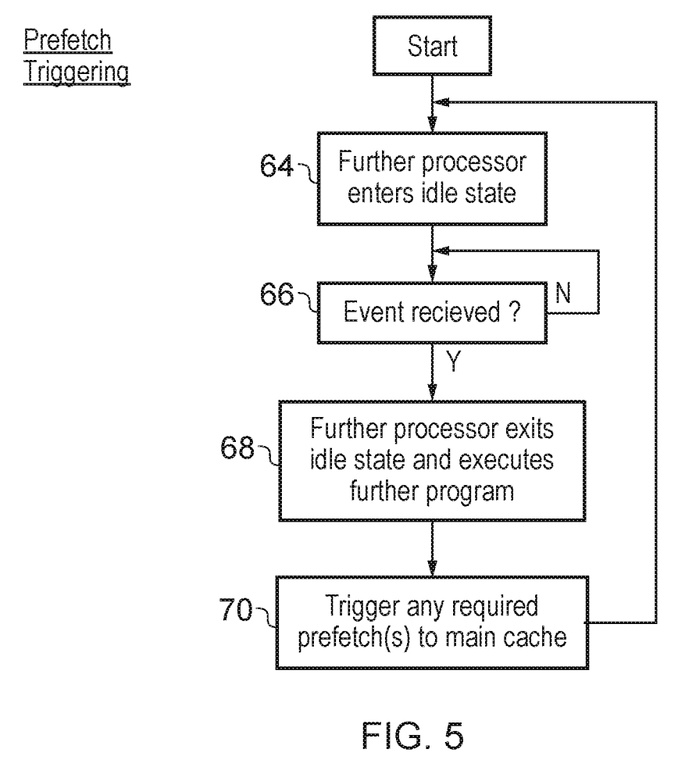
FIG. 5 is a flow diagram schematically illustrating prefetch triggering.

FIG. 5 schematically illustrates prefetch triggering by the further program executed by the programmable further processor 16, 18. The programmable further processors 16, 18 are initialised to an idle state at step 64. Processing then waits at step 66 until an event is received from the scheduling circuitry 24. Such an event may be received by assertion of a "wake up" signal, or assertion of an appropriate interrupt signal, of the programmable further processor 16, 18. When an event is received, step 68 wakes up the programmable further processor 16, 18 such that it exits the idle state and begins execution of the further program. The further program may analyse the event notified to it (and optionally the associated metadata) in order to determine the appropriate prefetching action to trigger. The prefetching action to be triggered may vary in a variety of different ways, e.g. the memory address from which the prefetch is to be made, the time at which the prefetch is to be made, the block size of the prefetch, etc. The further program may also write data to the statistical analysis circuitry 20 to record state data to be used subsequently in further prefetch control. When the processing at step 68 has determined the nature of any prefetch operation (or operations—a prefetch event may trigger one, many or no prefetch operations) to be triggered, step 70 triggers this prefetch operation via the prefetch circuitry 28 in order that the data concerned is prefetched from the level to cache memory (or main memory) back to the level one data cache 6.

Figure 6A:
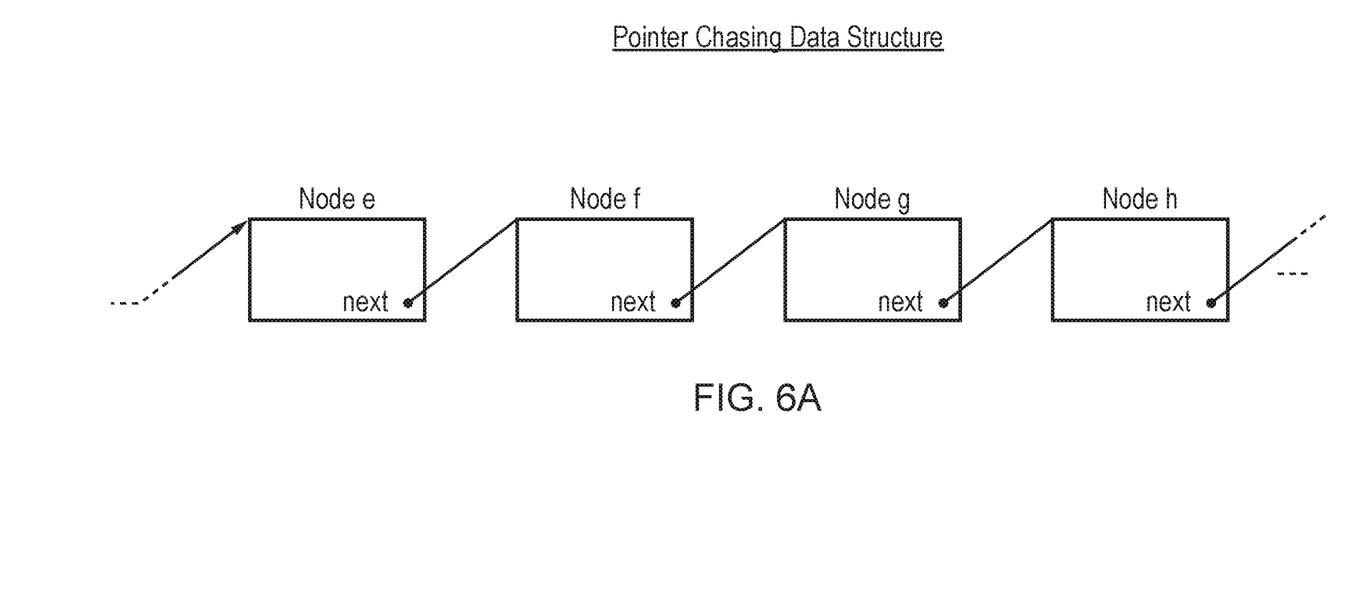
FIGS. 6A and 6B schematically illustrate prefetching during execution of a pointer chasing main program by a main processor.

FIG. 6A schematically illustrates a pointer chasing data structure in which blocks of data are processed at each node until the end of the block is reached and a pointer to the next block of data is read or calculated. The time taken to process the blocks by the main processor 4 can vary (and so the time between loads by the main processor 4) and the main processor 4 itself cannot determine the pointers to the next block before it has at least received a current block.

Figure 6B:
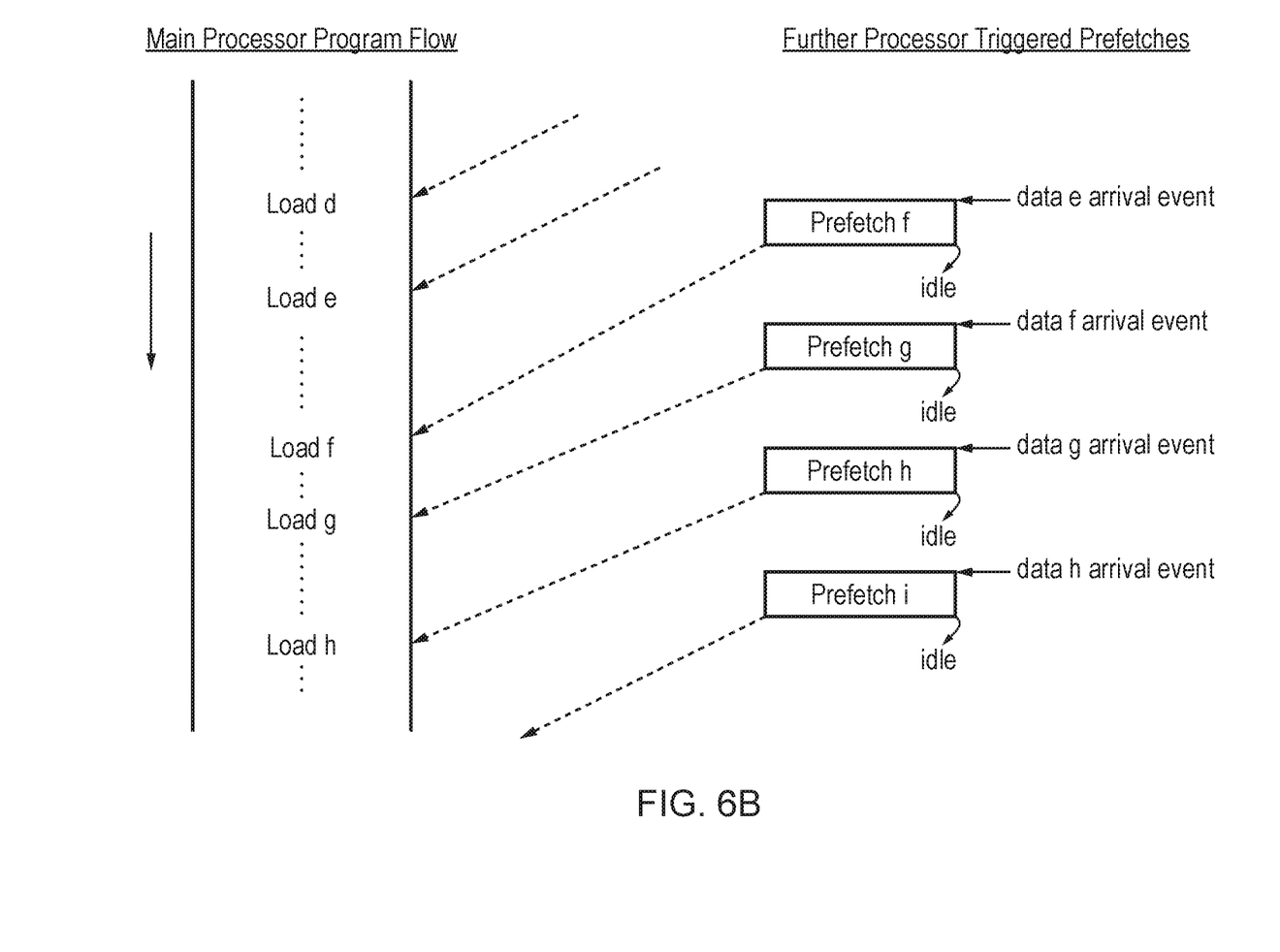

FIG. 6B schematically illustrates the action of the main processor 4 performing pointer chasing data processing and the programmable further processors 16, 18 performing prefetching. The time taken to return data from the main memory following a prefetch can vary, but it is likely the data will still be available by the time it is needed by the main processor 4 which accordingly does not stall. A prefetch block of data is triggered by a data arrival event notified to one of the programmable further processors 16, 18 and corresponding to arrival of the data of the preceding block. The prefetch of blocks occurs while the main processor 4 is still processing earlier blocks within the pointer chasing sequence. There is no direct coupling that determines how far ahead the programmable further processors 16, 18 perform their prefetching as this is determined by the runtime behaviour and the statistical values.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
a main processor to execute a main program;
a cache memory coupled to said main processor;
event detection circuitry to detect events including a memory operation consequent upon execution of said main program by said main processor and indicative of data to be used by said main processor;
a further processor responsive to detection of said memory operation by said event detection circuitry to trigger execution of a further program by said further processor; and
prefetch circuitry responsive to said further program to trigger prefetch of said data to be used by said main processor to said cache memory;
wherein said event detection circuitry comprises programmable filter circuitry to detect said memory operation matching a programmable filter characteristic; and
said programmable filter characteristic comprises said memory operation is directed to a memory address within one or more programmable memory address ranges.

2. Apparatus as claimed in claim 1, wherein said event detection circuitry further comprises cache event detection circuitry to detect cache events associated with the operation of said cache memory, wherein said cache events include one or more of:
a cache fetch event to initiate a fetch of data to said cache memory;
a cache fill event to load fetched data to said cache memory;
a cache eviction event;
a cache hit event; and
a cache miss event.

3. Apparatus as claimed in claim 1, wherein said programmable filter characteristic further comprises one or more of:
said memory operation is return of data to said cache memory as part of a memory transaction including a tag value matching a predetermined tag value;
whether said memory operation relates to reading data from memory;
whether said memory operation relates to storing data to memory;
size of said memory operation;
security permissions associated with said memory operation; and
whether said memory operation is a cache hint operation.

4. Apparatus as claimed in claim 1, wherein said event detection circuitry further comprises statistical analysis circuitry to generate one or more statistical values in dependence upon at least one of:
said events; and
one or more inputs from said further programs.

5. Apparatus as claimed in claim 4, wherein said further processor reads said one or more statistical values as an input to said further program.

6. Apparatus as claimed in claim 4, wherein said one or more statistical values comprises a memory latency value indicative of a time taken to fetch data to said cache memory from a main memory.

7. Apparatus as claimed in claim 4, wherein said one or more statistical values comprise one or more of:
an moving average value;
an exponentially weighted moving average value;
a minimum value; and
a maximum value.

8. Apparatus as claimed in claim 1, wherein said event detection circuitry further comprises circuitry to detect one or more of:

branch behaviour predicted by branch prediction circuitry;

memory snoop requests within a coherent shared memory system;

system event signals; and interrupt signals.

9. Apparatus as claimed in claim 1, comprising queue circuitry to queue event data indicative of events detected by said event detecting circuitry.

10. Apparatus as claimed in claim 9, comprising scheduling circuitry to read said event data from said queue circuitry and schedule said further processor to execute said further program.

11. Apparatus as claimed in claim 1, comprising a further cache memory coupled to said further processor to store at least one of said further program and data values manipulated by said further processor.

12. Apparatus as claimed in claim 1, wherein said main processor is capable of a higher instruction throughput than said further processor.

13. Apparatus as claimed in claim 1, wherein said main processor is switchable to operate in a plurality of different modes having respective different performance characteristics.

14. Apparatus as claimed in claim 1, wherein said further processor executes one of a plurality of further programs selected in dependence upon said one or more of said events.

15. Apparatus as claimed in claim 1, comprising a plurality of further processors triggered to execute a respective further program by said event detection circuitry when said event detection circuitry detects a respective one or more of said events.

16. Apparatus as claimed in claim 5, wherein respective different further processors execute a same further program when triggered by a same said one or more of said events.

17. Apparatus as claimed in claim 1, wherein said main processor, said cache memory, said event detection circuitry, said further processor and said prefetch circuitry are formed together as part of an integrated circuit.

18. Apparatus as claimed in claim 1, wherein said main processor and said further processor operate at a same privilege level within a plurality of privilege levels.

19. Apparatus comprising:

main processor means for executing a main program;

cache memory means for storing data and coupled to said main processor means;

event detection means for detecting events including a memory operation consequent upon execution of said main program by said main processor means and indicative of data to be used by said main processor means;

further processor means responsive to detection of said memory operation by said event detection means for triggering execution of a further program by said further processor means; and prefetch circuitry means responsive to said further program for triggering prefetch of said data to be used by said main processor means to said cache memory;

wherein said event detection circuitry comprises programmable filter circuitry to detect said memory operation matching a programmable filter characteristic; and said programmable filter characteristic comprises said memory operation is directed to a memory address within one or more programmable memory address ranges.

20. A method of controlling data prefetch comprising:

executing a main program with a main processor;

storing data in a cache memory coupled to said main processor;

detecting events including a memory operation directed to a memory address within one or more programmable memory address ranges consequent upon execution of said main program by said main processor and indicative of data to be used by said main processor;

in response to detection of said memory operation, triggering execution of a further program by a further processor; and in response to said further program, triggering prefetch of said data to be used by said main processor means to said cache memory.

* * * * *